Patented Mar. 3, 1942

2,275,006

UNITED STATES PATENT OFFICE 2,275,006

MANUFACTURE OF PHTHALIC ACID-MONO-PHENYL-AMIDES

Jakob Bindler, Basel, Switzerland, assignor to the firm of J. R. Geigy A. G., Basel, Switzerland No Drawing. Application November 20, 1939, Serial No. 305,352. In Switzerland November 30, 1938

6 Claims. (Cl. 260—518)

From the British Patent 449,081 it is known that the condensation of poly-carboxylic acids with primary or secondary amines, which contain a higher molecular aliphatic radical, results in carboxylic-acid-amides with at least one free carboxyl group, which can be used as softening, cleansing, emulsifying, wetting agents and so on.

It has now been found that by condensation of phthalic acid or its functional derivatives such as for example its chloride or anhydride in molecular proportion 1:1 with secondary aromatic amines of the benzene series, containing at the nitrogen an aliphatic radical with 16 to 18 carbon atoms, phthalic acid mono-phenyl-amides are obtained which, besides their otherwise mostly better properties in respect of hard water stability, are by far superior to the compounds of the aforesaid British patent. This knowledge is not disclosed in the said patent nor are the compounds according to the present invention described therein.

The condensation is carried out in the usual manner, for example in organic solvents such as benzene, chlorobenzene and so on, but in an especially advantageous manner by using phthalic acid anhydride with or without the assistance of condensation agents, such as AlCl$_3$, ZnCl$_2$, etc.

The new, alkali-soluble condensation products are salve-like masses yielding also with hard water strongly foaming solutions of marked emulsifying, cleansing, wetting and softening effect. They show especially strong substantive properties, lend to the treated textile materials, e. g. fibres of regenerated cellulose a markedly soft, supple feel and possess the great advantage of being capable of use simultaneously with direct dyestuffs in the dye-bath, and do not cause precipitation of lime soap in hard water.

The following examples illustrate the invention, the parts being by weight.

Example 1

69 parts of octodecylaniline and 35.5 parts of phthalic acid anhydride are dissolved in 250 parts of carbon disulphide and 53.5 parts of aluminum chloride are added thereto by portions at 10–15° C. At first the condensation is performed at ordinary temperature, then the mass is slowly heated to boiling and kept for 14 hours at this temperature. The condensation mixture is thereupon poured on ice, the mixture extracted with ether and the extract dried. After having distilled off the solvent mixture, the obtained phthalic acid mono-octodecyl-anilide is made into a paste with water, neutralized with diluted caustic soda lye, or another alkali. The solution is filtered and evaporated to dryness. The sodium salt is a brown, waxy mass which completely dissolves in water to a clear solution.

The aforesaid phthalic acid compound has the following formula:

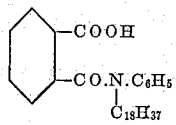

Example 2

69 parts of oleyl aniline and 35.5 parts of phthalic acid anhydride are dissolved in 200 parts of benzene and 27 parts of anhydrous zinc-chloride are added thereto. Then the whole is condensed for 10 hours at 60° C. and hydrochloric acid gas is passed therethrough during the condensation. The reaction being achieved, the benzene solution is filtered, washed several times with water and the azeotropic water-benzene-mixture distilled off in vacuo. The residue dissolves in caustic soda lye to a clear solution.

The obtained phthalic acid compound has the following formula:

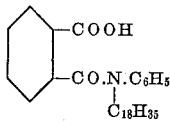

Example 3

31.5 parts of cetylaniline and 35.5 parts of phthalic acid anhydride are dissolved in 250 parts of benzene and condensed over night at 60–70° C. Then the solvent is distilled off, the condensation product made phenolphthalein-alkaline with caustic soda lye and then evaporated to dryness.

The obtained phhthalic acid compound has the following formula:

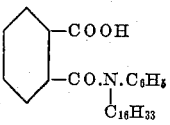

In place of the aromatic bases used in the above examples, their homologues such as octodecyl-o-, m- or p-toluidine or amines which contain other organic radicals with 16–18 carbon atoms, such as the oleyl- or cetyl-toluidines or xylidines, can be used.

Instead of phthalic acid anhydride the acid, the chloride or the esters with lower alcohols may be used.

The treatment of cellulose fibres for the purpose of obtaining soft feel may for example be carried out as follows:

An artificial silk skein is dyed in the boiling bath in a bath proportion of 1:25 in the usual manner with substantive dyestuffs with addition of Glauber's salt. Simultaneously with the dyestuff 1 to 4% of a soluble salt of a compound of the above mentioned examples are added to the dyeing bath. After dyeing the goods are as usual rinsed cold and dried. The artificial silk skein has an agreeable, soft flowing feel.

For example 10 g. of viscose yarn are dyed in 250 ccm. of water with 2% of diphenyl-blue-black GHS (Schultz, dyestufftables, 1931, No. 391) under addition of 2% of the sodium salt of the aforesaid phthalic acid-mono-octodecyl-anilide and 20% of Glauber's salt. This is only added after about 15 minutes. The dyeing duration amounts to one hour altogether.

One may also operate as follows:

A Foulard or padding machine is charged with a 2 per cent solution of the sodium salt of mono-oleyl-anilide of phthalic acid, cotton is treated therein on 100% squeeze-out effect and dried. The goods possess a very good, soft feel.

What I claim is:

1. A process for the manufacture of phthalic acid mono-phenyl-amides, comprising condensing a phthalic acid body in molecular proportion 1:1 with a secondary aromatic amine of the benzene series containing at the nitrogen an aliphatic radical with 16 to 18 C-atoms.

2. A process for the manufacture of phthalic acid mono-phenyl-amides, comprising condensing phthalic acid anhydride in molecular proportion 1:1 with a secondary aromatic amine of the benzene series containing at the nitrogen an aliphatic radical with 16-18 C-atoms.

3. A process for the manufacture of phthalic acid mono-octodecylanilide, comprising condensing phthalic acid anhydride in a solvent in molecular proportion 1:1 with octodecylaniline in presence of aluminium chloride.

4. A process for the manufacture of phthalic acid mono-oleylanilide, comprising condensing phthalic acid anhydride in a solvent in molecular proportion 1:1 with oleylaniline in presence of zinc chloride.

5. A process for the manufacture of phthalic acid mono-cetylanilide, comprising condensing phthalic acid anhydride in a solvent in molecular proportion 1:1 with cetylaniline.

6. The phthalic acid mono-phenyl-amides as products of condensation of a phthalic acid body and a secondary aromatic amine of the benzene series containing at the nitrogen an aliphatic radical with 16 to 18 C-atoms, and corresponding to the formula

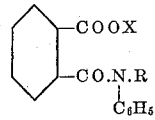

wherein X represents a member of the group consisting of H and alkali metal, and R represents an aliphatic radical with 16 to 18 C-atoms.

JAKOB BINDLER.